US012346121B2

(12) United States Patent
Heinzle et al.

(10) Patent No.: US 12,346,121 B2
(45) Date of Patent: Jul. 1, 2025

(54) SYSTEM FOR 3D SURVEYING BY A UGV AND A UAV WITH AUTOMATIC PROVISION OF REFERENCING OF UGV LIDAR DATA AND UAV LIDAR DATA

(71) Applicant: HEXAGON GEOSYSTEMS SERVICES AG, Heerbrugg (CH)

(72) Inventors: Lukas Heinzle, Wädenswil (CH); Pascal Gohl, Winterhur (CH); Andreas Gerster, Eutingen (DE); Pascal Strupler, Ennetbaden (CH)

(73) Assignee: HEXAGON GEOSYSTEMS SERVICES AG, Heerbrugg (CH)

( * ) Notice: Subject to any disclaimer, the term of this patent is extended or adjusted under 35 U.S.C. 154(b) by 435 days.

(21) Appl. No.: 17/895,891

(22) Filed: Aug. 25, 2022

(65) Prior Publication Data
US 2023/0064401 A1 Mar. 2, 2023

(30) Foreign Application Priority Data

Aug. 25, 2021 (EP) .................................. 21193138

(51) Int. Cl.
*G05D 1/00* (2024.01)
(52) U.S. Cl.
CPC ........... *G05D 1/0253* (2013.01); *G05D 1/024* (2013.01); *G05D 1/0251* (2013.01)
(58) Field of Classification Search
CPC .... G05D 1/0253; G05D 1/024; G05D 1/0251; G05D 1/0274; G01S 7/4808;
(Continued)

(56) References Cited

U.S. PATENT DOCUMENTS 8,874,264 B1 * 10/2014 Chiappetta ............ A47L 9/2894
701/1
11,721,225 B2 8/2023 Wang
(Continued)

FOREIGN PATENT DOCUMENTS

| CN | 111448476 A | 7/2020 | | |
|---|---|---|---|---|
| CN | 113281723 A | 8/2021 | | |
| JP | 2024140949 A | * 10/2024 | | |
| WO | WO-2014148976 A1 | * 9/2014 | ............ | B60W 30/00 |

(Continued)

OTHER PUBLICATIONS

JP-2024140949-A (Year: 2024).*
(Continued)

*Primary Examiner* — Frederick M Brushaber
(74) *Attorney, Agent, or Firm* — Maschoff Brennan

(57) ABSTRACT

A system for 3D surveying of an environment by an unmanned ground vehicle (UGV) and an unmanned aerial vehicle (UAV) has two lidar devices. A reference unit has a first and a second marker in a spatially fixed arrangement. An automatic detection of the first marker is carried out for a coordinative measurement by the first lidar device to determine relative position data for providing relative position information of the first marker with respect to the first lidar device. The relative position data and spatial 3D information is used for an automatic detection and a coordinative measurement of the second marker by the second lidar device. The coordinative measurements are used for a referencing of lidar data of the UGV lidar device and lidar data of the UAV lidar device with respect to a common coordinate system.

15 Claims, 4 Drawing Sheets

(58) Field of Classification Search
CPC ........ G01S 7/4817; G01S 17/42; G01S 17/46;
G01S 17/66; G01S 17/86; G01S 17/87;
G01S 17/89; G01S 17/933
See application file for complete search history.

(56) References Cited

U.S. PATENT DOCUMENTS

| | | | |
|---|---|---|---|
| 2010/0023185 A1* | 1/2010 | Terwelp | G01S 19/47 356/3 |
| 2011/0035086 A1* | 2/2011 | Kim | G05D 1/0238 701/42 |
| 2018/0259652 A1 | 9/2018 | Shimizu et al. | |
| 2020/0218282 A1 | 7/2020 | Chiappetta | |
| 2022/0272314 A1* | 8/2022 | Rueb | G01C 11/025 |
| 2023/0064071 A1* | 3/2023 | Heinzle | G01S 17/66 |

FOREIGN PATENT DOCUMENTS

| | | | |
|---|---|---|---|
| WO | WO-20220044325 A1 * | 3/2020 | ............ G01C 21/32 |
| WO | 2020/181419 A1 | 9/2020 | |

OTHER PUBLICATIONS

Xiang et al., "Ground and aerial meta-data integration for localization an reconstruction: a review" Aug. 1, 2018.

Kim et al., "Urgan scene understanding from aerial and ground LIDAR data" Jul. 16, 2010.

Quenzel et al., "Autonomous Fire Fighting with a UAV UGV Team at MBZIRC 2020" Jun. 11, 2021.

European Search Report dated Feb. 15, 2022 as received in application No. 21193138.1.

CN Office Action dated Apr. 11, 2025 as received in Application No. 202210981042.2.

* cited by examiner

SYSTEM FOR 3D SURVEYING BY A UGV AND A UAV WITH AUTOMATIC PROVISION OF REFERENCING OF UGV LIDAR DATA AND UAV LIDAR DATA

CROSS-REFERENCE TO RELATED APPLICATIONS

This patent application claims priority to European Patent Application No. 21193138.1 filed Aug. 25, 2021, which application is incorporated herein by specific reference in its entirety.

BACKGROUND

Field

The present invention relates to a system for providing 3D surveying of an environment by an unmanned ground vehicle (UGV) and an unmanned aerial vehicle (UAV).

Description of Related Art

By way of example, three-dimensional surveying is used to assess an actual condition of an area of interest, e.g. a restricted or dangerous area such as a construction site, an industrial plant, a business complex, or a cave. The outcome of the 3D surveying may be used to efficiently plan next work steps or appropriate actions to react on a determined actual condition.

Decision making and planning of work steps is further aided by means of a dedicated digital visualization of the actual state, e.g. in the form of a point cloud or a vector file model, or by means of an augmented reality functionality making use of the 3D surveying data.

3D surveying often involves optically scanning and measuring an environment by means of a laser scanner, which emits a laser measurement beam, e.g. using pulsed electromagnetic radiation. By receiving an echo from a backscattering surface point of the environment a distance to the surface point is derived and associated with an angular emission direction of the associated laser measurement beam. This way, a three-dimensional point cloud is generated. For example, the distance measurement may be based on the time of flight, the shape, and/or the phase of the pulse.

For additional information, the laser scanner data may be combined with camera data, in particular to provide high-resolution spectral information, e.g. by means of an RGB camera or an infrared camera.

However, acquiring the 3D data can be cumbersome and in some cases even dangerous for a human worker. Often, access to a specific area is prohibited or severely restricted for a human worker.

Nowadays, robotic vehicles, particularly autonomous robotic vehicles, are increasingly used to facilitate data acquisition and to reduce risks on human workers. 3D surveying devices used in combination with such robotic vehicles are typically configured to provide surveying data during movement of the robotic vehicle, wherein referencing data provide information on a trajectory of a data acquisition unit, e.g. position and/or pose data, such that surveying data acquired from different positions of the data acquisition unit can be combined into a common coordinate system.

The 3D surveying data may then be analyzed by means of a feature recognition algorithm for automatically recognizing semantic and/or geometric features captured by the surveying data, e.g. by means of using shape information provided by virtual object data from a CAD model. Such feature recognition, particularly for recognizing geometric primitives, are nowadays widely used to analyze 3D data.

Many different types of autonomous robotic vehicles are known. For example, ground based robotic vehicles may have a plurality of wheels for propelling the robot, typically having sophisticated suspension to cope with different kinds of terrain. Another widely used type is a legged robot, e.g. a four-legged robot, which is often able to handle tough terrain and steep inclines. Aerial robotic vehicles, e.g. quadcopter drones, allow further versatility to survey areas that are difficult to access, but often to the expense of less surveying time and/or sensor complexity due to limited often load capacity and battery power.

Unmanned Arial Vehicles (UAV) and Unmanned Ground Vehicles (UGV) are for themselves state-of-the-art platforms for multilateral use. Equipped with imaging and lidar sensors, these platforms provide for autonomous path planning and for autonomously moving an acquisition unit for acquiring 3D surveying and reality capture data.

For movement control and path planning, the autonomous robotic vehicle is often configured to autonomously create a 3D map of a new environment, e.g. by means of a simultaneous localization and mapping (SLAM) functionality, using data from sensors of the robotic vehicle.

In the prior art, movement control and path planning for the surveying campaign are predominantly governed by making use of inbuilt visual perception sensors of the autonomous robot. Acquisition and use of 3D surveying data are typically decoupled from acquisition and use of control data to move the robot.

In prior art robotic vehicles, often a tradeoff has to be made between field-of-view and viewing distance on the one side and reactivity (e.g. for obstacle detection and initiating an evasive maneuver) on the other side, which limits movement speed of the robot. Often, the robot only "sees" its immediate surroundings, which provides efficient reactivity to cope with obstacles and terrain changes, while larger scale path control is provided by predefined environment models and guiding instructions. For example, this limits applicability of mobile 3D surveying by autonomous robotic vehicles in unknown terrain. In known terrain, predefining paths to be followed is cumbersome and often involves skilled personnel to take into account various measurement requirements such as a desired point density, measurement speed, or measurement accuracy.

The combination of multiple autonomous robotic vehicles provides flexibility in surveying large and varied areas (e.g. different soil conditions, measurements from the ground and from the air, etc.). Each mobile surveying device may provide 3D surveying data. By way of example, from each measurement location a surveying device generates a so-called local 3D point cloud providing multiple measurement points referenced to a common coordinate system relative to the surveying device. When moving the surveying device, the local point clouds determined in different locations of the surveying device have to be related to each other by a process called referencing, point cloud registration, point set registration, or scan matching in order to form a so-called 3D survey point cloud of the respective surveying device. In addition, the 3D survey point clouds from different surveying devices located on different autonomous robotic vehicles have to be referenced to each other in order to form a so-called "combined" 3D survey point cloud.

For referencing local point clouds of the same surveying device, often additional information such as data from an inertial measurement unit and a simultaneous localization and mapping (SLAM) unit provided by the surveying device are used.

Often, referencing of different survey point clouds from different surveying devices is cumbersome and only possible in post-processing. For example, the referencing process is made even more difficult by the fact that often different kinds of surveying sensors are used, e.g. wherein the sensors of different surveying devices provide different point densities, field-of-views, and distance resolution. In case image data are used, different image distortions have to be accounted for, etc.

In order to save computing time, point matching often involves an operator who manually identifies and links matching features in different survey point clouds of different surveying devices. Having an essentially real-time fusion of different 3D data of different devices is thus often not possible or error prone and susceptible to interruption.

SUMMARY

In some embodiments, the present invention provides an improved system for mobile 3D surveying, which has increased applicability, particularly in view of surveying varying and extensive terrain.

In some embodiments, the present invention provides a mobile 3D surveying system, which is easier to handle and is more robust against interruption.

In some embodiments, the invention can be achieved by realizing at least part of the features of the independent claims. Features which further develop the invention in an alternative or advantageous manner are described in the dependent patent claims.

In some embodiments, the invention relates to a system for providing 3D surveying of an environment, wherein the system comprises a first and a second lidar device. One of the first and the second lidar device, in the following referred to as UGV lidar device, is specifically foreseen for a montage on an unmanned ground vehicle and configured to generate UGV lidar data to provide a coordinative scan of the environment relative to the UGV lidar device. The other of the first and the second lidar device, in the following referred to as UAV lidar device, is specifically foreseen for a montage on an unmanned aerial vehicle and configured to generate UAV lidar data to provide a coordinative scan of the environment relative to the UAV lidar device. The system is configured to provide a referencing of the UGV lidar data and the UAV lidar data with respect to a common coordinate system for determining a (combined) 3D survey point cloud of the environment.

In some embodiments, the system is configured to provide a localization of the UGV lidar device in a digital 3D model based on the UAV lidar data and, vice versa, to provide a localization of the UAV lidar device in a digital 3D model based on the UGV lidar data.

In some embodiments, the system comprises a reference unit comprising a first and a second marker, wherein the first and the second marker are in a spatially fixed arrangement with respect to each other and each of the first and the second marker is configured as target for a coordinative measurement of the respective marker by a lidar device. The system is configured to carry out an automatic detection of the first marker and to carry out a coordinative measurement of the first marker by the first lidar device to determine relative position data providing relative position information of the first marker with respect to the first lidar device. Furthermore, the system is configured to take into account the relative position data and a spatial 3D information on the spatially fixed arrangement of the first and the second marker with respect to each other to carry out an automatic detection of the second marker and to carry out a coordinative measurement of the second marker by the second lidar device. The coordinative measurement of the first marker and the coordinative measurement of the second marker are then taken into account to provide the referencing of the UGV lidar data and the UAV lidar data with respect to the common coordinate system.

By way of example, both the UGV lidar device and the UAV lidar device are provided with a combined start/end reference. The first and the second markers are referenced to each other by design, e.g. mechanically, wherein one marker allows to be well detected by the starting/landing UAV. For example, in the nominal setup of the reference unit, the first marker is arranged in the vertical plane and the second marker is arranged in the horizontal plane. The first marker then allows to be well detected by an AGV passing by while the second marker allows to be well detected by a starting/ stopping UAV. The two markers thus provide a base reference between UAV and UGV, allowing to spatially fuse the UGV lidar data and the UAV lidar data.

Accordingly, in some embodiments, one of the first marker and the second marker, in the following referred to as UGV marker, is configured that in a nominal setup of the reference unit it is spatially arranged in such a way that the UGV lidar device can carry out a coordinative measurement of the UGV marker, wherein the coordinative measurement of the UGV marker is carried out from a sideways looking field-of-view associated with the montage of the UGV lidar device on the UGV. The other of the first and the second marker, in the following referred to as UAV marker, is configured that in the nominal setup of the reference unit, it is spatially arranged in such a way that the UAV lidar device can carry out a coordinative measurement of the UAV marker, wherein the coordinative measurement of the UAV marker is carried out from a downward looking field-of-view associated with the montage of the UAV lidar device on the UAV.

In some embodiments, the system is configured that the coordinative measurement of the first marker is carried out by the UGV lidar device and the coordinative measurement of the second marker is carried out by the UAV lidar device, wherein the automatic detection of the second marker and the coordinative measurement of the second marker by the UAV lidar device is carried out at each take-off and landing of the unmanned aerial vehicle.

For example, the system is configured that the relative position data is continuously updated so that the relative position information provides continuously updated spatial information about the arrangement between the first marker and the UGV lidar device.

In some embodiments, a further marker on the UGV may be used to provide a link between UAV and UGV along the mobile mapping process. For example, this provides a larger baseline to overcome inaccuracies of the referenced start marker. Accordingly, in a further embodiment, the system comprises a further marker (in addition to the first and the second marker), which is specifically foreseen for a montage on the unmanned ground vehicle. The UAV lidar device is configured to automatically carry out a coordinative measurement of the further marker and the system is configured to take into account the coordinative measurement of the further marker to provide the referencing of the UGV lidar data and the UAV lidar data with respect to the common coordinate system.

In some embodiments, spatial localization between UAV lidar device and UGV lidar device may be based on sparse maps from imagery and/or lidar data. For example, a sparse map is generated by a camera and/or lidar device of either the UAV or UGV. The corresponding UGV or UAV then localizes (in real-time) within the sparse map. Accordingly, in a further embodiment, the system comprises a visual pick-up device configured to be arranged on the unmanned ground vehicle or the unmanned aerial vehicle, e.g. wherein the visual pick-up device is a camera or one of the UGV lidar device or the UAV lidar device. The system is configured to generate a sparse map using the visual pick-up device and to carry out a localization of the UGV lidar data or the UAV lidar data in the sparse map.

By way of example, the sparse map is generated by photogrammetric triangulation, e.g. so-called structure from motion, and the localization comprises a first referencing between the UGV lidar data and the UAV lidar data. Then, after the first referencing, a second referencing between the UGV lidar data and the UAV lidar data is carried out based on point-cloud matching between the UGV lidar data and the UAV lidar data, wherein the sparse map is referenced with respect to a known digital model of the environment.

For example, known methods for the point-cloud matching include iterative closest point-to-point, iterative closest point-to-plane, robust point matching, and Kernel correlation point set registration. The known digital model may be at least one of a digital building information model (BIM), a computer aided design model (CAD), and a digital model, e.g. a vector file model, generated from coordinative scan data provided by a terrestrial laser scanner (TLS), a mobile mapping system, or a photogrammetric capture device.

In some embodiments, the system is configured to access assignment data, which provide the spatial 3D information on the spatially fixed arrangement of the first and the second marker with respect to each other.

Alternatively, or in addition, at least one of the first and the second marker comprises a visible code, e.g. a barcode or matrix barcode, which provides the spatial 3D information on the spatially fixed arrangement of the first and the second marker with respect to each other. Here, the system is configured to determine the spatial 3D information on the spatially fixed arrangement of the first and the second marker with respect to each other by using a visual pick-up device, e.g. a camera or a barcode laser scanning device.

For example, the first and the second markers are embodied to be mechanically compatible with standard markers used in the prior art as survey control points. They may be particularly embodied that they can be measured with standard survey equipment such as a total station. The marker may further be embodied that they can be automatically identified and detected in a point cloud software. For example, the markers contain coded information that can be read by the UGV and/or UAV lidar device and by a point cloud software during post processing, while at the same time the markers have a visual feature that allows a measurement with total station.

In some embodiments, the first and the second marker are arranged on a common component such that the relative spatial arrangement of the first and the second marker is mechanically fixed.

By way of example, the common component further comprises an alignment indicator, e.g. a bubble level, providing for a visual determination of an alignment of the common component with respect to an outer coordinate system or with respect to a cardinal direction to establish the nominal setup.

In some embodiments, at least one of the first and the second (or the further marker, see above) marker comprises a visually detectable pattern, e.g. provided by areas of different reflectivity, different gray scales and/or different colors. The system is configured to determine a 3D orientation of the pattern by determining geometric features in an intensity image of the pattern, wherein the intensity image of the pattern is acquired by a scanning of the pattern with a lidar measurement beam of the UGV lidar device or the UAV lidar device and a detection of an intensity of a returning lidar measurement beam. A plane fit algorithm is carried out in order to determine an orientation of a pattern plane, by analyzing an appearance of the geometric features in the intensity image of the pattern, and the system is configured to take into account the 3D orientation of the pattern for providing the referencing of the UGV lidar data and the UAV lidar data with respect to the common coordinate system.

By way of example, the pattern comprises a circular feature and the system is configured to identify an image of the circular feature within the intensity image of the pattern. The plane fit algorithm is configured to fit an ellipse to the image of the circular feature and, based thereof, to determine the orientation of the pattern plane. For example, the system is further configured to determine the center of the ellipse and to derive aiming information for aiming with the lidar measurement beam to the center of the ellipse. The center of the ellipse may then be used as aiming point to further determine a 3D position of the marker, e.g. allowing to determine and take into account a 6DoF pose (six degrees of freedom, position and orientation) of the marker.

In some embodiments, the pattern comprises inner geometric features, e.g. comprising rectangular features, which are enclosed by the circular feature. For example, the inner geometric features provide information on an alignment of the common coordinate system or an outer coordinate system, and/or the spatial 3D information on the spatially fixed arrangement of the UGV marker and the UAV marker with respect to each other.

In some embodiments, the first and the second marker each comprise a visible indication of the directions of at least two, particularly three, of the three main axes which span the common coordinate system, wherein the system is configured to determine the directions of the three main axes by using the UGV lidar device and the UAV lidar device, and to take into account the directions of the three main axes for providing the referencing of the UGV lidar data and the UAV lidar data with respect to the common coordinate system.

In some embodiments, the coordinative scan of the environment by the UGV lidar device is provided according to a UGV scan pattern that is provided locally by the UGV lidar device, wherein the UGV scan pattern has multiple scanning directions relative to the UGV lidar device. Similarly, the coordinative scan of the environment by the UAV lidar device is provided according to a UAV scan pattern that is provided locally by the UAV lidar device, wherein the UAV scan pattern has multiple scanning directions relative to the UAV lidar device. Furthermore, the UGV scan pattern provides the same local angular distribution of the multiple scanning directions, the same angular point resolution of its individual scanning directions, and the same distance resolution as the UAV scan pattern. Thus, the UGV lidar data and the UAV lidar data are provided intrinsically with the same measurement parameters, which provides simplified referencing of the UGV lidar data and the UAV lidar data to the common coordinate system.

By way of example, the UGV lidar device and the UAV lidar device are in each case embodied as laser scanner, which is configured to generate lidar data by means of a rotation of a laser beam about two rotation axes, wherein the laser scanner comprises a rotating body configured to rotate about one of the two rotation axes and to provide for a variable deflection of an outgoing and a returning part of the laser beam, thereby providing a rotation of the laser beam about the one of the two rotation axes, often referred to as fast axis. The rotating body is rotated about the fast axis with at least 50 Hz and the laser beam is rotated about the other of the two rotation axes, often referred to as slow axis, with at least 0.5 Hz. The laser beam is emitted as pulsed laser beam, e.g. wherein the pulsed laser beam comprises 1.5 million pulses per second, providing for a point acquisition rate of the lidar data of at least 300,000 points per second. For the rotation of the laser beam about the two axes the field-of-view about the fast axis is at least 130 degrees and about the slow axis 360 degrees.

By way of example, the UGV lidar device/laser scanner is embodied that when mounted on the UGV the slow axis is essentially arranged vertical and the UAV lidar device/laser scanner is embodied that when mounted on the UAV the slow axis is essentially horizontal. Thus, the UAV lidar device has real-time coverage of the area above the UAV, in front of the UAV, and the surface below the UAV. The UGV lidar device has real-time coverage of the floor and the areas in front, above, and behind the UGV.

In some embodiments, the system comprises a UGV simultaneous localization and mapping unit, UGV SLAM unit, and a UAV simultaneous localization and mapping unit, UAV SLAM unit. The UGV SLAM unit is configured for reception of the UGV lidar data as UGV perception data providing a representation of the surroundings of the UGV lidar device at a current position, use of the UGV perception data to generate a UGV map of an environment, and determination of a trajectory of a path that the UGV lidar device has passed within the UGV map of the environment. The UAV SLAM unit is configured for reception of the UAV lidar data as UAV perception data providing a representation of the surroundings of the UAV lidar device at a current position, use of the UAV perception data to generate a UAV map of an environment, and determination of a trajectory of a path that the UAV lidar device has passed within the UAV map of the environment.

In order to provide for sufficient data processing power, the system may have connection means for data exchange between the UGV lidar device and the UAV lidar device with a data cloud which provides for cloud computing, e.g. to determine the 3D survey point cloud or to carry out at least part of the processing for the evaluation of a further trajectory of the UGV or the UAV, respectively. In particular on side of the UGV, the system can profit from on-board computing, e.g. by means of a dedicated computing unit provided with the UGV lidar device or by means of a computing unit of the unmanned ground vehicle, which significantly extends computing capabilities in case connection to the cloud is lost or in case data transfer rate is limited. Of course, the same is possible for the UAV but typically with a UAV the load capacity and battery power are already limited. Another possibility is the inclusion of a connectivity to a companion device, e.g. a tablet, which could be configured to determine the 3D survey point cloud or to carry out at least part of the processing for the evaluation of the further trajectories of the UGV or the UAV similar than the cloud processing. The local companion device could then take over processing for areas where there is limited or no connectivity to the cloud, or the local companion device could serve as a cloud interface in the sense of a relay between on-board computing and cloud computing. By way of example, switching between on-board computing, cloud processing, and processing by the companion device is carried out dynamically as a function of connectivity between the three processing locations.

In some embodiments, the system comprises an on-board computing unit specifically foreseen to be located on the unmanned ground vehicle and configured to carry out at least part of a system processing, wherein the system processing comprises carrying out the SLAM process for the UGV or the UAV, providing the referencing of the UGV and UAV lidar data, and carrying out the evaluation of the further trajectories of either the UGV and the UAV or both. The system further comprises an external computing unit configured to carry out at least part of the system processing. A communication module of the system is configured to provide for a communication between the on-board computing unit and the external computing unit, wherein the system comprises a workload selection module configured to monitor an available bandwidth of the communication module for the communication between the on-board computing unit with the external computing unit, to monitor an available power of the on-board computing unit, the UGV and/or UAV lidar devices, the SLAM units of the UGV and UAV, and the path planning unit, and to dynamically change an assignment of at least part of the system processing to the on-board computing unit and the external computing unit depending on the available bandwidth and the available power assigned to the external processing unit.

By way of example, localization is processed either locally on a computing device (which is either part of the UGV or the UAV or which is a separate computing base station) or in the "cloud". Similarly, computation with regard to marker detection and reference transformation, sparse map generation, scan area definition and gap filling may be distributed on different on-board, local, and cloud based computing units.

For example, in order to minimize computation weight on the UAV, fast connectivity between the UAV, the UGV, the companion device, and the cloud is implemented. For example, communication to the cloud is based on a 4G/5G uplink, wherein a local connection (e.g. WLAN) is used between UAV and UGV and/or companion device to download data from UAV to the UGV and/or the companion device. On-board processing or companion processing is especially interesting if the UAV has a better line-of-sight but bad cloud connectivity (e.g. when observing in a canyon).

In order to dynamically assign processing steps to the different computing units, e.g. deciding where data is processed and how the data is uploaded, an arbitrator or scheduler unit (in the sense of a strategic controller) may be implemented on either the UGV, the UAV, the companion device or the base-station.

In some embodiments, the system is configured for carrying out a system processing, which comprises carrying out a SLAM process associated with the unmanned ground vehicle and/or the unmanned aerial vehicle, providing the referencing of the UGV lidar data and/or the UAV lidar data to the common coordinate system, and carrying out a path planning to determine a further trajectory to be followed by the unmanned ground vehicle and/or the unmanned aerial vehicle. The system comprises a UGV computing unit specifically foreseen to be located on the unmanned ground vehicle and configured to carry out at least part of the system processing. Similarly, the system comprises a UAV computing unit specifically foreseen to be located on the unmanned aerial vehicle and configured to carry out at least part of the system processing and the system comprises an external computing unit configured to carry out at least part of the system processing.

A communication unit of the system is configured to provide a mutual communication between the UGV computing unit, the UAV computing unit, and the external computing unit by using a cellular communication connection, e.g. 4G or 5G. The communication unit further provides for a mutual communication between the UGV computing unit and the UAV computing unit by using a local communication connection, e.g. WLAN or Bluetooth.

Here, the system further comprises a workload selection module configured to monitor an available bandwidth for the cellular communication connection and for the local communication connection to carry out a dynamic change of an assignment of at least part of the system processing to the UGV computing unit, the UAV computing unit, and the external computing unit. The dynamic change of the assignment depends on the available bandwidth for the cellular communication connection and for the local communication connection, wherein a prioritization rule is implemented to minimize the available processing load of the UAV computing unit before minimizing the available processing load of the UGV computing unit, and to minimize the available processing load of the UGV computing unit before minimizing the available processing load of the external computing unit.

The dynamic change of the assignment may further depend on the availability of UAV and/or UGV battery power, i.e. wherein the workload for either the UAV and/or UGV computing unit is selected depending on which has most battery power available.

The dynamic change of the assignment may further depend on a requirement of SLAM associated with the UGV lidar data and/or UAV lidar data. For example, the dynamic change of the assignment may be based on a requirement to provide sufficient overlap of the sparse map with the known digital model.

BRIEF DESCRIPTION OF THE DRAWINGS

The system according to the different aspects of the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention.

DETAILED DESCRIPTION

Figure 1:
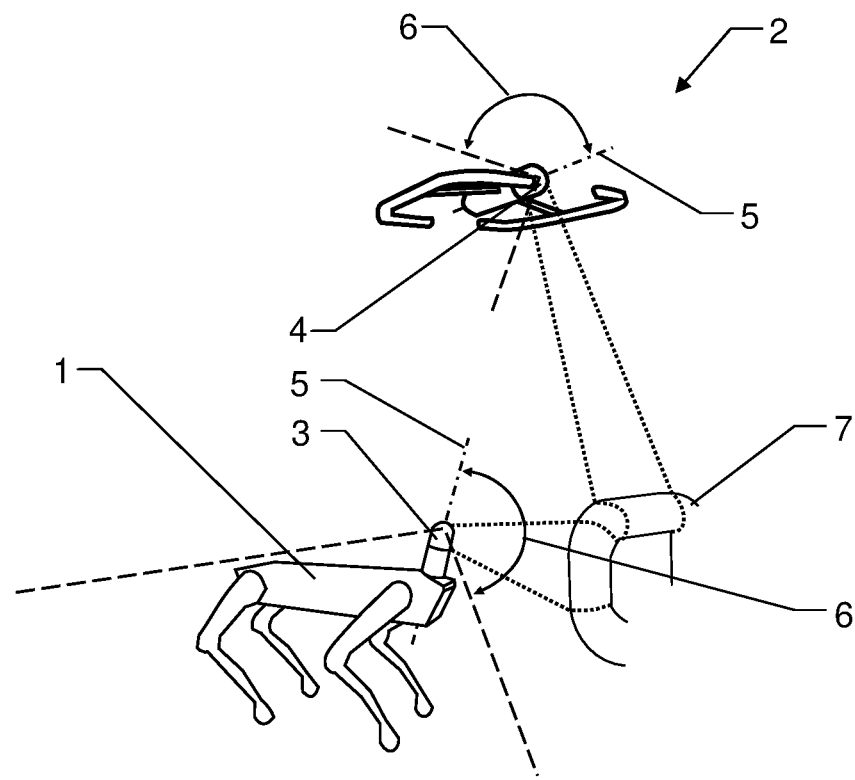
FIG. 1: an exemplary embodiment of an unmanned ground vehicle working together with an unmanned aerial vehicle.

FIG. 1 depicts an exemplary embodiment of an unmanned ground vehicle (UGV) 1, working together with an unmanned aerial vehicle (UAV) 2. Each of the UGV 1 and the UAV 2 is equipped with a lidar device referred to as UGV lidar device 3 and UAV lidar device 4, respectively.

Here, the robotic ground vehicle 1 is embodied as a four-legged robot. For example, such robots are often used in unknown terrain with different surface properties having debris and steep inclines. The ground robot 1 has sensors and processing capabilities to provide for simultaneous localization and mapping, which comprises reception of perception data providing a representation of the surroundings of the autonomous ground robot 1 at a current position, use of the perception data to generate a map of the environment, and determination of a trajectory of a path that the ground robot 1 has passed within the map of the environment.

The aerial vehicle 2 is embodied as quadcopter drone, which allows further versatility to survey areas that are difficult or impossible to access by the robotic ground vehicle 1. Similarly to the UGV 1, the aerial vehicle 2 has sensors and processing capabilities to provide for simultaneous localization and mapping, which comprises reception of perception data providing a representation of the surroundings of the unmanned aerial vehicle 2 at a current position, use of the perception data to generate a map of the environment, and determination of a trajectory of a path that the aerial vehicle 2 has passed within the map of the environment.

Figure 2:
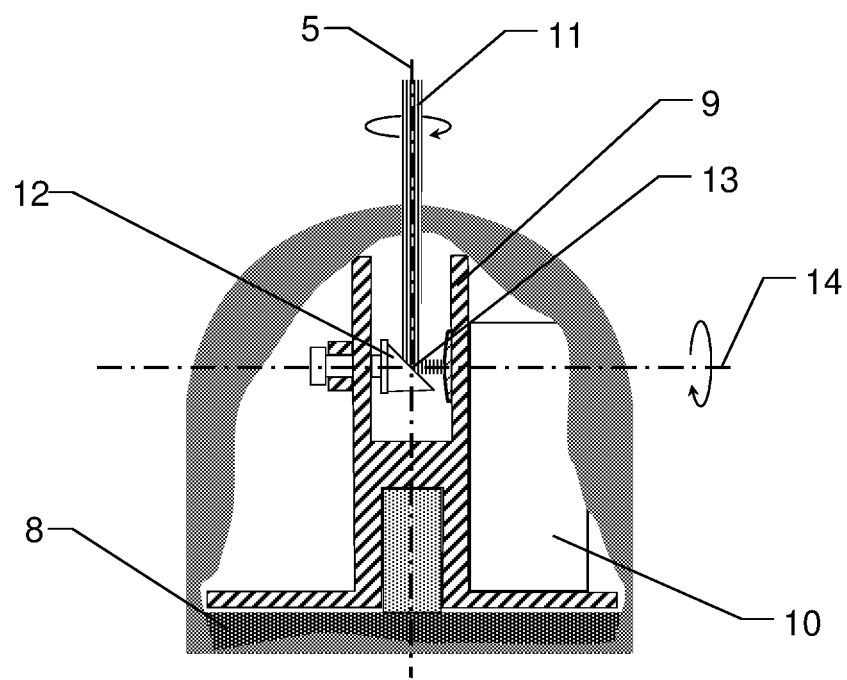
FIG. 2: an exemplary embodiment of the lidar device of the unmanned ground vehicle or the unmanned aerial vehicle, respectively.

Each of the UGV lidar device 3 and UAV lidar device 4 has a field-of-view of 360 degrees about a so-called slow axis 5 and a so-called band field-of-view 6 of at least 130 degrees about a fast axis (see FIG. 2). Both lidar devices 3, 4 are each configured to generate the corresponding lidar data with a point acquisition rate of at least 300'000 points per second. For example, the UGV lidar device 3 and the UAV lidar device 4 are each embodied as so-called two-axis laser scanner (see FIG. 2), wherein in case of the UGV lidar device 3, the fast axis 5 is essentially aligned vertical and in case of the UAV lidar device 4, the fast axis 5 is essentially aligned horizontal.

The SLAM units of the UGV and the UAV respectively, are configured to receive the corresponding lidar data as the perception data, which, for example, provides improved field-of-view and viewing distance and thus improved larger scale path determination. For example, this is particularly beneficial for exploring unknown terrain. Another benefit comes with the all-around horizontal field-of-view about the slow axis 5 and the band field-of-view 6 of 130 degrees about the fast axis. In case of the UGV 1 this provides the capability to essentially cover the front, the back, and the ground at the same time, wherein in case of the UAV 2 this provides the capability to essentially cover the back and the ground at the same time.

By way of example, the lidar data generated by means of the UGV lidar device 3 and the UAV lidar device 4 can be combined for gap-filling of complimentary system data. Typically, the UGV lidar device 3 "sees" objects close to the ground and in a side perspective (facades, soffit, etc.) and is used for indoor surveying (buildings, tunnels, etc.). The UAV lidar device 4 observes objects above ground (upper level facades, roof, etc.) and is often used for outdoor surveying (buildings, bridges, etc.). In the figure, both the UAV lidar device 4 and the UGV lidar device 3 are exemplarily used to coordinatively measure a pipe 7, e.g. on a power plant site, wherein the UAV lidar device 4 predominantly observes the top part of the pipe 7 and the UGV lidar device 3 only observes the pipe 7 from a side perspective.

The combination of a UGV 1 and a UAV 2 further allows to carry out a scan area definition for the UGV 1 (or the UGV lidar device 3) by means of an exploration flight of the UAV 2 and the UAV lidar device 4. By the exploration flight, a region of interest to be surveyed by the UGV lidar device 3 is defined. For example, the UAV 2 provides for generation of an overview of path, where UGV 1 is following. Spatial anchoring (re-localization) allows matching of the UGV lidar data and the UAV lidar data and trajectory alignment for line-of-sight environments.

The exploration by the UAV also allows to estimate if a particular measurement goal can be reached with constraints, e.g. providing for an improved estimate whether the battery of the UAV 2 or the UGV 1 is enough to fulfill a foreseen task. Since battery power of a UAV is typically limited, the UGV 1 may further be configured as landing/docking station for the UAV 2 and as a moving charging station for the UAV 2. This way the reach by the UAV 2 can be extended by re-charging, e.g. during periods where only surveying by the UGV lidar device 3 is required, e.g. when stepping in an indoor environment. Similarly, while heavy data download may be preferably carried out in a docked state of the UAV 2 on the UGV 1.

FIG. 2 shows an exemplary embodiment of the UGV lidar device 3 or the UAV lidar device 4, respectively, in the form of a so-called two-axis laser scanner. The laser scanner comprises a base 8 and a support 9, the support 9 being rotatably mounted on the base 8 about the slow axis 5. Often the rotation of the support 9 about the slow axis 5 is also called azimuthal rotation, regardless of whether the laser scanner, or the slow axis 5, is aligned exactly vertically.

The core of the laser scanner is an optical distance measuring unit 10 arranged in the support 9 and configured to perform a distance measurement by emitting a pulsed laser beam 11, e.g. wherein the pulsed laser beam comprises 1.5 million pulses per second, and by detecting returning parts of the pulsed laser beam by means of a receiving unit comprising a photosensitive sensor. Thus, a pulse echo is received from a backscattering surface point of the environment, wherein a distance to the surface point can be derived based on the time of flight, the shape, and/or the phase of the emitted pulse.

The scanning movement of the laser beam 11 is carried out by rotating the support 9 relative to the base 8 about the slow axis 5 and by means of a rotating body 12, which is rotatably mounted on the support 9 and rotates about a so-called fast axis 14, here a horizontal axis. By way of example, both the transmitted laser beam 11 and the returning parts of the laser beam are deflected by means of a reflecting surface integral with the rotating body 12 or applied to the rotating body 12. Alternatively, the transmitted laser radiation is coming from the side facing away from the reflecting surface, i.e. coming from the inside of the rotating body 12, and emitted into the environment via a passage area within the reflecting surface.

For the determination of the emission direction of the distance measuring beam 11 many different angle determining units are known in the prior art. For example, the emission direction may be detected by means of angle encoders, which are configured for the acquisition of angular data for the detection of absolute angular positions and/or relative angular changes of the support 9 or of the rotating body 12, respectively. Another possibility is to determine the angular positions of the support 9 or the rotating body 12, respectively, by only detecting full revolutions and using knowledge of the set rotation frequency.

A visualization of the data can be based on commonly known data processing steps and/or display options, e.g. wherein the acquired data is presented in the form of a 3D point cloud or wherein 3D vector file model is generated.

The laser scanner is configured to ensure a total field of view of the measuring operation of the laser scanner of 360 degrees in an azimuth direction defined by the rotation of the support 9 about the slow axis 5 and at least 130 degrees in a declination direction defined by the rotation of the rotating body 12 about the fast axis 14. In other words, regardless of the azimuth angle of the support 9 about the slow axis 5, the laser beam 11 can cover a so-called band field of view, in the figure a vertical field of view, spread in the declination direction with a spread angle of at least 130 degrees.

By way of example, the total field of view typically refers to a central reference point 13 of the laser scanner defined by the intersection of the slow axis 5 with the fast axis 14.

Figure 3:
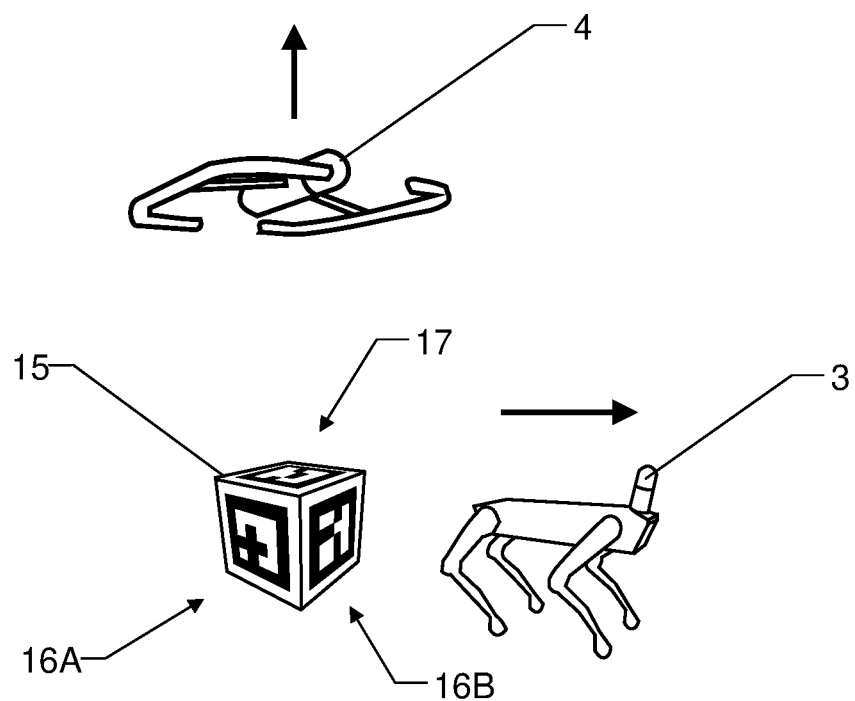
FIG. 3: exemplary embodiment of a reference unit comprising UGV markers and a UAV marker.

FIG. 3 exemplary shows an embodiment of a reference unit 15 according to the invention, comprising UGV markers 16A, 16B and a UAV marker 17.

Here, the reference unit 15 is embodied in the shape of a cube. In a nominal setup, e.g. wherein one of the sides of the cube is aligned exactly horizontally, the reference unit 15 provides four (vertical) sides useable to provide for UGV markers 16A, 16B and one (horizontal) side useable to provide for a UAV marker 17. For example, the setting up of the cube in its nominal setup is aided by a bubble level.

Here, the UGV markers 16A, 16B and the UAV marker 17 comprise visible codes providing spatial 3D information on the spatially fixed arrangement of the UGV markers 16A, 16B and the UAV marker 17 with respect to each other. The spatial 3D information can be determined by reading the codes by visual pickup units arranged on the UGV and the UAV, respectively, e.g. cameras or the UGV and UAV lidar devices.

When the UGV and the UGV lidar device 3 pass the reference cube 15, a visible UGV marker 16B is automatically identified and a coordinative measurement of the visible UGV marker 16B is carried out by the UGV lidar device 3, whereby relative position data providing relative position information of the visible UGV marker 16B with respect to the UGV lidar device 3 is determined. Thus, the relative position and particularly orientation of the moving UGV lidar device 3 with respect to the identified visible UGV marker 16B is tracked such that it can be used to facilitate later detection of the UAV marker 17 by the, e.g. starting, UAV.

By way of example, upon start of the UAV, the relative position data and the determined spatial 3D information on the spatially fixed arrangement of the identified visible UGV marker 16B and the UAV marker 17 with respect to each other are taken into account to carry out an automatic detection of the UAV marker 17 and to carry out a coordinative measurement of the UAV marker 17 by the UAV lidar device 4. The coordinative measurement of the identified visible UGV marker 16B and the coordinative measurement of the UAV marker 17 are then taken into account to provide the referencing of the UGV lidar data and the UAV lidar data with respect to a common coordinate system.

Figure 4:
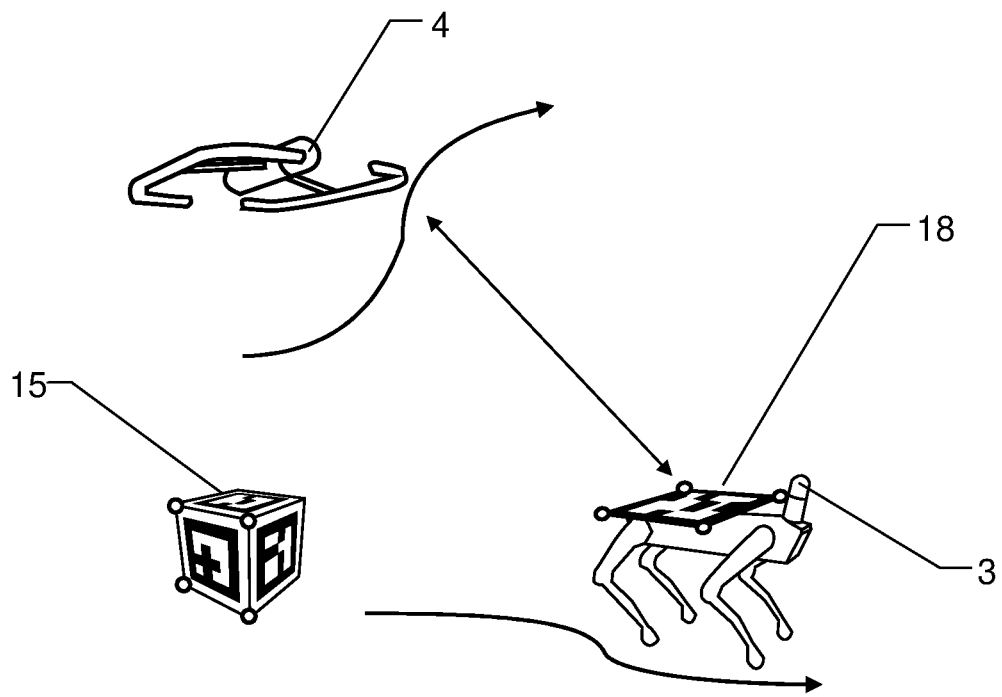
FIG. 4: an exemplary workflow using a reference unit comprising UGV markers and a UAV marker, wherein the unmanned ground vehicle comprises a further marker as reference for the unmanned aerial vehicle.

FIG. 4 depicts a further exemplary workflow using a reference unit 15 comprising UGV markers and a UAV marker, wherein the unmanned ground vehicle comprises a further marker 18 as reference for combining the UAV lidar data and the UGV lidar data in the common coordinate system.

The further marker 18 is arranged on the UGV and used to provide a link between the UAV lidar device 4 and the UGV lidar device 3 along the mobile mapping process. The UAV lidar device 4 is configured to automatically carry out a coordinative measurement of the further marker 18 in order to take into account the coordinative measurement of the further marker 18 to provide the referencing of the UGV lidar data and the UAV lidar data with respect to the common coordinate system. For example, in case positional relationships of different reference units within the environment are known, e.g. absolute positions of different reference units given in an outer coordinate system, a larger baseline to overcome inaccuracies in the coordinative measurements of the referenced start marker is provided and, for example, can be used for so-called loop closure of the SLAM algorithms, which allows to compensate positional drifts when referencing ("stitching together") lidar data of different positions along the way of the UGV or the AGV.

Some of the markers, e.g. one of the UGV marker 16A, 16B, the UAV marker 17, and the further marker 18 arranged on the UGV, may further comprise a reference value indication, which provides positional information, e.g. 3D coordinates, regarding a set pose of the marker in the common coordinate system or in an outer coordinate system, e.g. a world-coordinate system. The set pose is a 6DoF pose, i.e. position and orientation of the marker, and indicates the desired 6DoF pose of the marker. Thus, when correctly placed in the environment, this marker can act as so-called survey control point, e.g. for loop closure of a SLAM process and/or as absolute reference in a world coordinate system or a local site coordinate system.

By way of example, the system is configured to derive the set pose and to take into account the set pose for the referencing of the UGV lidar data and the UAV lidar data in the common coordinate system, e.g. by determining a pose of the marker in the common coordinate system or in the world coordinate system and carrying out a comparison of the determined pose of the marker and the set pose.

Figure 5:
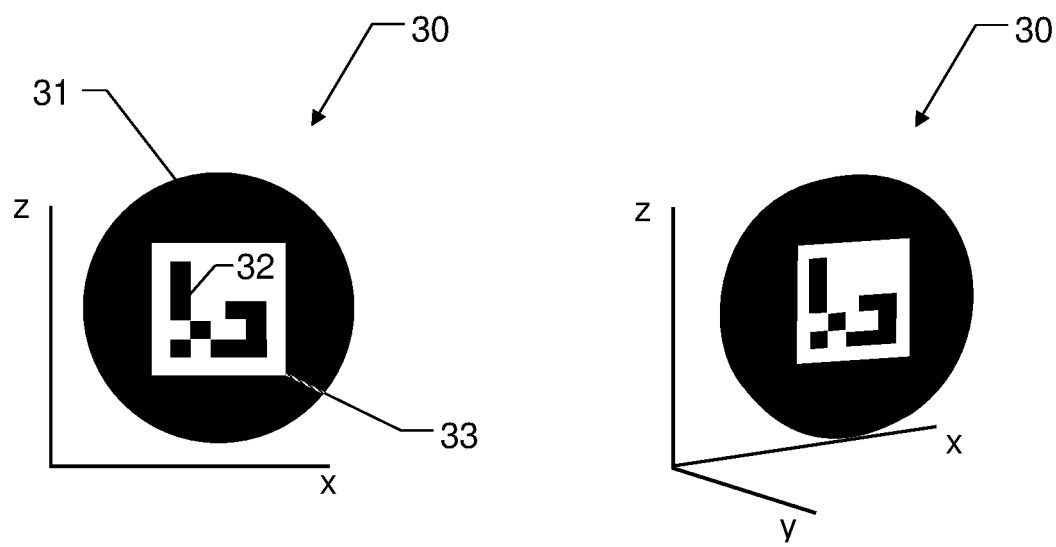
FIG. 5: an exemplary embodiment of a marker, e.g. one of the UGV marker, the UAV marker, and the further marker arranged on the UGV.

FIG. 5 depicts an exemplary embodiment of a marker 30, e.g. one of the UGV marker 16A, 16B, the UAV marker 17, and the further marker 18 arranged on the UGV (see FIGS. 3 and 4). On the left, the marker 30 is shown in a frontal view. On the right, the marker 30 is shown in an angled view.

The marker comprises a visually detectable pattern, e.g. provided by areas of different reflectivity, different gray scales and/or different colors. The pattern comprises a circular feature 31 and inner geometric features 32, which are enclosed by the circular feature 31.

By way of example, the system is configured to determine the 6DoF (six degrees of freedom) pose of the marker. The 6DoF pose is derived by determining a 3D orientation of the pattern, i.e. a 3D orientation of a pattern plane, and by determining a 3D position of the pattern. For example, marker corners 33 (at least three) are analyzed to provide for determination of an angle of the pattern plane. The marker corners 33 may be determined using a camera on the UGV or the UAV, respectively.

The circular feature 31 provides for improved determination of the 3D orientation of the pattern plane. By way of example, the system is configured to generate an intensity image of the pattern by a scanning of the pattern with a lidar measurement beam of the UGV lidar device or the UAV lidar device, respectively, wherein the intensity image is generated by detection of an intensity of a returning lidar measurement beam. By identifying the image of the circular feature within the intensity image of the pattern and running a plane fit algorithm to fit an ellipse to the image of the circular feature the 3D orientation of the pattern plane is determined with improved precision. In addition, the center of the ellipse may be determined and used as aiming point for the lidar device to determine the 3D position of the pattern, thereby allowing to determine the 6DoF pose of the pattern.

The 3D orientation of the pattern, particularly the 6DoF pose of the pattern, are then taken into account for providing the referencing of the UGV lidar data and the UAV lidar data with respect to the common coordinate system.

Figure 6:
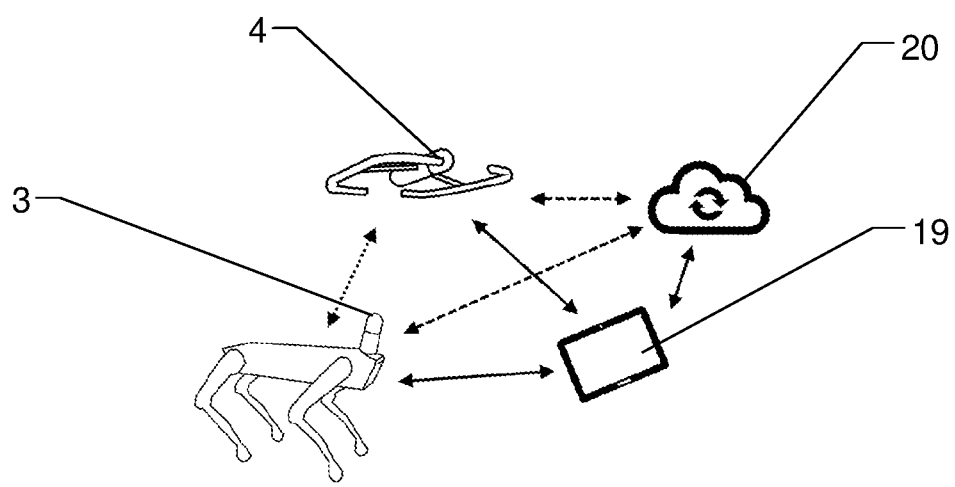
FIG. 6: an exemplary communication scheme between the unmanned ground vehicle, the unmanned aerial vehicle, a companion device, and cloud processing.

FIG. 6 depicts an exemplary communication scheme between the unmanned ground vehicle, e.g. the UGV lidar device 3, the unmanned aerial vehicle, e.g. the UAV lidar device 4, a companion device 19, e.g. a tablet, and a data cloud 20 providing for cloud processing.

By way of example, an operator's tablet 19 is locally connected, e.g. by means of a Bluetooth or WLAN connection to the UAV lidar device 4 and the UGV lidar device 3, wherein the tablet allows mediating control of both lidar devices 3, 4. The tablet 19 is further connected to a cloud processing unit 20.

An optional connection between UAV lidar device 4 and UGV lidar device 3 provides redundancy in case connectivity to the tablet 19 is lost. Cloud connectivity of the tablet 19, the UAV lidar device 4, and the UGV lidar device 3 allows operation without local connection and provides an additional fallback scenario. For example, cloud connectivity is established via 4G/5G uplink.

For example, such versatile communication capability allows to implement dynamic distribution of processing and data storage, e.g. to coordinate a desired data processing rate and battery life.

Figure 7:
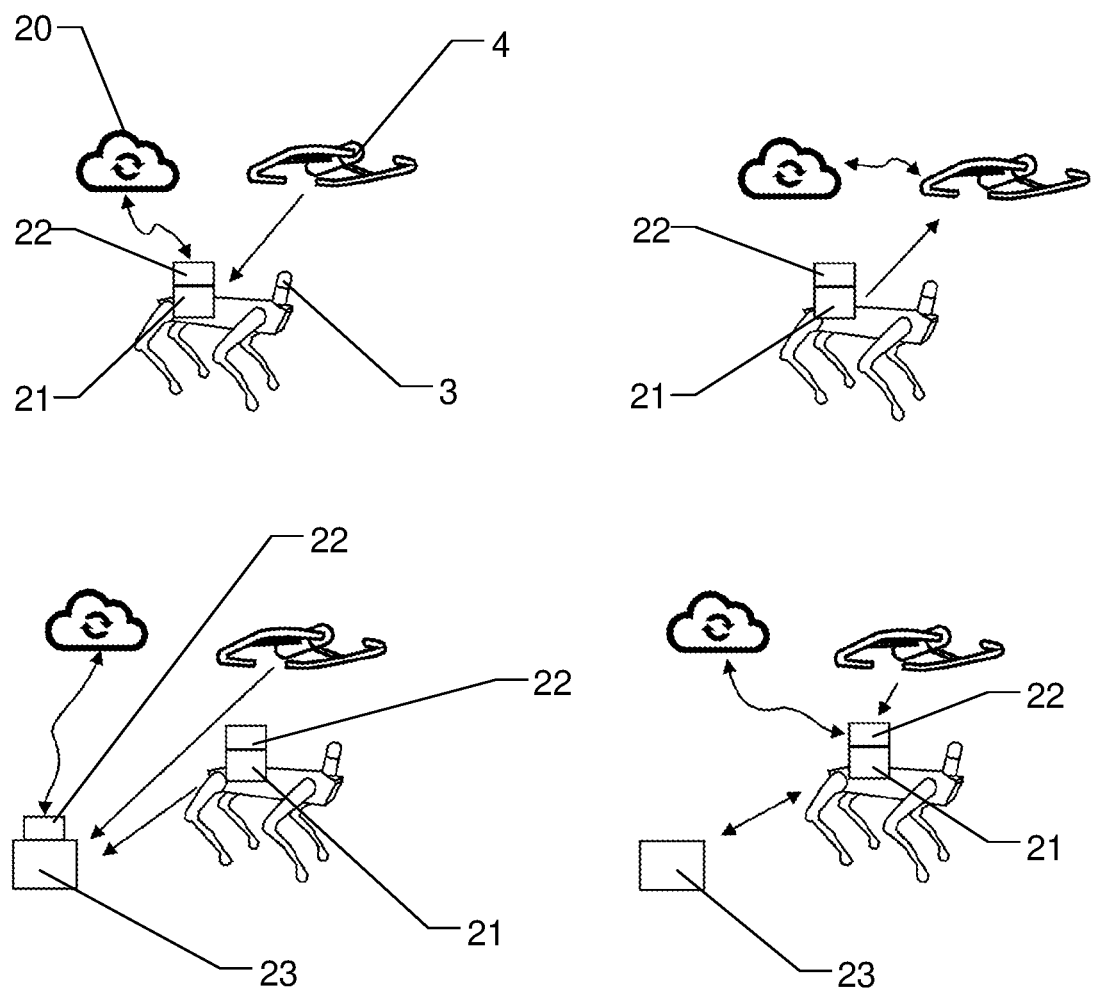
FIG. 7: further exemplary communication schemes with dynamic allocation of processing steps to different computing units.

FIG. 7 shows exemplary communication schemes with dynamic allocation of processing steps to different computing units. Here, the unmanned ground vehicle comprises an on-board computing unit 21 and a cellular communication uplink 22 to the cloud 20. Similarly, the UAV comprises a cellular communication uplink (not shown) to the cloud 20. In two bottom schematics, the system further comprises a base-station 23 located close the UGV and configured for comparatively heavy computing (compared to the on-board computing unit 21). The base-station 23 may also have a cellular communication uplink 22 to the cloud 20 (bottom left schematic) or data upload to the cloud 20 may predominantly be carried out over the UGV cellular communication uplink 22 (bottom right schematic), e.g. wherein the UGV uplink 22 acts as relay between the base station 23 and the cloud 20.

The on-board computing unit 21 of the UGV and the base-station 23 provide to minimize processing on the UAV and thus to save battery life of the UAV.

In the top left schematic a local data connection, e.g. by WLAN, is established between the UAV lidar device 4 and the on-board computing unit 21 of the UGV in order to download data from the UAV lidar device 4. The UGV on-board computing unit, which has more payload capability, is computing results in-field, and provides an uplink functionality to cloud computing services 20.

In the top right schematic, a local connection, e.g. by WLAN, is established to upload data from the UGV on-board computing unit 21 and/or the UGV lidar device to the UAV cellular uplink (not shown), which provides the data to the cloud 20. For example, this approach is used if the UAV has a better line-of-sight or connectivity to the cloud 20, e.g. when the UGV is walking in a canyon with limited or no connectivity.

In the bottom left schematic, local connections are established in order to download data from the UAV lidar device 4, the UGV lidar device 3, and the UGV on-board computing unit 21 to the base station 23. The main processing payload is on side of the base-station 23 and the cloud 20, which have established a cellular data connection between each other.

Similarly, in the bottom right schematic main processing is on side of the base-station 23 and the cloud 20, but communication with the cloud 20 is routed over the UGV data uplink 22.

By way of example, an arbitrator or scheduler unit, e.g. located on the UGV or on the base station 23 is used to dynamically distribute processing to the different processing units, e.g. to distribute at least parts of calculating further trajectories, calculating maps of the SLAM process, and referencing the UGV lidar data and the UAV lidar data to a common coordinate system. The arbitratror or scheduler unit may also define where and how the data is uploaded/downloaded to/from the cloud 20.

In particular, switching between on-board computing, cloud processing, processing by the lidar devices, and processing by the companion device is carried out dynamically as a function of connectivity between the computing locations and available power on the UGV and the UAV. Typically, whenever possible processing is taken away from the UAV, and possibly also from the UGV, e.g. to the cloud, the companion device, and the base-station, because battery power and data storage of the UAV and UGV (and the devices located on the UAV and UGV) are limited.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A system for providing 3D surveying of an environment, wherein the system comprises a first and a second lidar device, wherein:
one of the first and the second lidar device, is an unmanned ground vehicle (UGV) lidar device configured to be mounted on an unmanned ground vehicle and configured to generate UGV lidar data to provide a coordinative scan of the environment relative to the UGV lidar device, the other of the first and the second lidar device is an unmanned aerial vehicle (UAV) lidar device configured to be mounted on an unmanned aerial vehicle and configured to generate UAV lidar data to provide a coordinative scan of the environment relative to the UAV lidar device, and the system is configured to provide a referencing of the UGV lidar data and the UAV lidar data with respect to a common coordinate system for determining a 3D survey point cloud of the environment, wherein:
the system comprises a reference unit comprising a first and a second marker, wherein the first and the second marker are in a spatially fixed arrangement with respect to each other and each of the first and the second marker is configured as target for a coordinative measurement of the respective marker by a lidar device, wherein the system is configured:
to carry out an automatic detection of the first marker and to carry out a coordinative measurement of the first marker by the first lidar device to determine relative position data providing relative position information of the first marker with respect to the first lidar device,
to take into account the relative position data and a spatial 3D information on the spatially fixed arrangement of the first and the second marker with respect to each other to carry out an automatic detection of the second marker and to carry out a coordinative measurement of the second marker by the second lidar device, and
to take into account the coordinative measurement of the first marker and the coordinative measurement of the second marker to provide the referencing of the UGV lidar data and the UAV lidar data with respect to the common coordinate system.

2. The system according to claim 1, wherein:
one of the first marker and the second marker is an UGV marker that is configured that in a nominal setup of the reference unit it is spatially arranged in such a way that the UGV lidar device can carry out a coordinative measurement of the UGV marker, wherein the coordinative measurement of the UGV marker is carried out from a sideways looking field-of-view associated with the montage of the UGV lidar device on the UGV,
the other of the first and the second marker is an UAV marker that is configured that in the nominal setup of the reference unit, it is spatially arranged in such a way that the UAV lidar device can carry out a coordinative measurement of the UAV marker, wherein the coordinative measurement of the UAV marker is carried out from a downward looking field-of-view associated with the montage of the UAV lidar device on the UAV.

3. The system according to claim 1, wherein:
the system is configured to access assignment data, which provide the spatial 3D information on the spatially fixed arrangement of the first and the second marker with respect to each other, and/or
at least one of the first marker and the second marker comprises a visible code, optionally a barcode, or optionally a matrix barcode, which provides the spatial 3D information on the spatially fixed arrangement of the first and the second marker with respect to each other, wherein the system is configured to determine the spatial 3D information on the spatially fixed arrangement of the first and the second marker with respect to each other by using a visual pick-up device.

4. The system according to claim 1, wherein:
the coordinative scan of the environment by the UGV lidar device is provided according to a UGV scan pattern that is provided locally by the UGV lidar device, wherein the UGV scan pattern has multiple scanning directions relative to the UGV lidar device,
the coordinative scan of the environment by the UAV lidar device is provided according to a UAV scan pattern that is provided locally by the UAV lidar device, wherein the UAV scan pattern has multiple scanning directions relative to the UAV lidar device, and
the UGV scan pattern provides the same local angular distribution of the multiple scanning directions, the same angular point resolution of its individual scanning directions, and the same distance resolution as the UAV scan pattern.

5. The system according to claim 1, wherein:
the UGV lidar device and the UAV lidar device are in each case embodied as a laser scanner, which is configured to generate lidar data by means of a rotation of a laser beam about two rotation axes, wherein:
the laser scanner comprises a rotating body configured to rotate about one of the two rotation axes and to provide for a variable deflection of an outgoing and a returning part of the laser beam, thereby providing a rotation of the laser beam about the one of the two rotation axes, fast axis, the rotating body is rotated about the fast axis with at least 50 Hz, the laser beam is rotated about the other of the two rotation axes, slow axis, with at least 0.5 Hz,
the laser beam is emitted as pulsed laser beam, particularly wherein the pulsed laser beam comprises 1.5 million pulses per second, providing for a point acquisition rate of the lidar data of at least 300,000 points per second, and
for the rotation of the laser beam about the two axes the field-of-view about the fast axis is 130 degrees and about the slow axis 360 degrees.

6. The system according to claim 1, wherein:
the first and the second marker are arranged on a common component such that the relative spatial arrangement of the first and the second marker is mechanically fixed,
optionally, wherein the common component comprises an alignment indicator providing for a visual determination of an alignment of the common component with respect to an outer coordinate system or with respect to a cardinal direction to establish the nominal setup.

7. The system according to claim 1, wherein:
at least one of the first and the second marker comprises a visually detectable pattern, optionally provided by areas of different reflectivity, different gray scales and/or different colors,
the system is configured to determine a 3D orientation of the pattern by:
determining geometric features in an intensity image of the pattern, wherein the intensity image of the pattern is acquired by a scanning of the pattern with a lidar measurement beam of the UGV lidar device or the UAV lidar device and a detection of an intensity of a returning lidar measurement beam, and
carrying out a plane fit algorithm in order to determine an orientation of a pattern plane, by analyzing an appearance of the geometric features in the intensity image of the pattern, and
the system is configured to take into account the 3D orientation of the pattern for providing the referencing of the UGV lidar data and the UAV lidar data with respect to the common coordinate system.

8. The system according to claim 7, wherein:
the pattern comprises a circular feature,
the system is configured to identify an image of the circular feature within the intensity image of the pattern, and
the plane fit algorithm is configured to fit an ellipse to the image of the circular feature and, based thereof, to determine the orientation of the pattern plane, particularly wherein the center of the ellipse is determined and aiming information for aiming with the lidar measurement beam to the center of the ellipse are derived,
optionally, wherein the pattern comprises inner geometric features, particularly comprising rectangular features, which are enclosed by the circular feature.

9. The system according to claim 1, wherein the first and the second marker each comprise a visible indication of the directions of at least two of the three main axes which span the common coordinate system, wherein the system is configured to determine the directions of the three main axes by using the UGV lidar device and the UAV lidar device, and to take into account the directions of the three main axes for providing the referencing of the UGV lidar data and the UAV lidar data with respect to the common coordinate system.

10. The system according to claim 1, wherein the system is configured that the coordinative measurement of the first marker is carried out by the UGV lidar device and the coordinative measurement of the second marker is carried out by the UAV lidar device, wherein the automatic detection of the second marker and the coordinative measurement of the second marker by the UAV lidar device is carried out at each take-off and landing of the unmanned aerial vehicle,
optionally, wherein the system is configured that the relative position data is continuously updated so that the relative position information provides continuously updated spatial information about the arrangement between the first marker and the UGV lidar device.

11. The system according to claim 1, wherein:
the system comprises a further marker, in addition to the first and the second marker, which is configured to be mounted on the unmanned ground vehicle, the UAV lidar device is configured to automatically carry out a coordinative measurement of the further marker, and
the system is configured to take into account the coordinative measurement of the further marker to provide the referencing of the UGV lidar data and the UAV lidar data with respect to the common coordinate system.

12. The system according to claim 1, wherein:
the system comprises a visual pick-up device configured to be arranged on the unmanned ground vehicle or the unmanned aerial vehicle, optionally, wherein the visual pick-up device is a camera or one of the UGV lidar device or the UAV lidar device,
the system is configured to generate a sparse map using the visual pick-up device and to carry out a localization of the UGV lidar data or the UAV lidar data in the sparse map.

13. The system according to claim 12, wherein:
the sparse map is generated by photogrammetric triangulation and the localization comprises a first referencing between the UGV lidar data and the UAV lidar data, and
after the first referencing, a second referencing between the UGV lidar data and the UAV lidar data is carried out based on point-cloud matching between the UGV lidar data and the UAV lidar data,
wherein the sparse map is referenced with respect to a known digital model of the environment.

14. The system according to claim 1, wherein the system comprises a UGV simultaneous localization and mapping unit (UGV SLAM unit) and a UAV simultaneous localization and mapping unit, UAV SLAM unit, wherein:
the UGV SLAM unit is configured for reception of the UGV lidar data as UGV perception data providing a representation of the surroundings of the UGV lidar device at a current position, use of the UGV perception data to generate a UGV map of an environment, and determination of a trajectory of a path that the UGV lidar device has passed within the UGV map of the environment, and
the UAV SLAM unit is configured for reception of the UAV lidar data as UAV perception data providing a representation of the surroundings of the UAV lidar device at a current position, use of the UAV perception data to generate a UAV map of an environment, and determination of a trajectory of a path that the UAV lidar device has passed within the UAV map of the environment.

15. The system according to claim 1, wherein the system is configured for carrying out a system processing, which comprises carrying out a SLAM process associated with the unmanned ground vehicle and/or the unmanned aerial vehicle, providing the referencing of the UGV lidar data and/or the UAV lidar data to the common coordinate system, and carrying out a path planning to determine a further trajectory to be followed by the unmanned ground vehicle and/or the unmanned aerial vehicle, wherein the system comprises:
 a UGV computing unit configured to be located on the unmanned ground vehicle and configured to carry out at least part of the system processing, a UAV computing unit configured to be located on the unmanned aerial vehicle and configured to carry out at least part of the system processing, an external computing unit configured to carry out at least part of the system processing,
 a communication unit configured:
  to provide a mutual communication between the UGV computing unit, the UAV computing unit, and the external computing unit by using a cellular communication connection, particularly 4G or 5G, and
  to provide a mutual communication between the UGV computing unit and the UAV computing unit by using a local communication connection, particularly WLAN or Bluetooth,
 a workload selection module configured to monitor an available bandwidth for the cellular communication connection and for the local communication connection to carry out a dynamic change of an assignment of at least part of the system processing to the UGV computing unit, the UAV computing unit, and the external computing unit, wherein the dynamic change of the assignment depends:
  on the available bandwidth for the cellular communication connection and for the local communication connection, and
  a prioritization rule to minimize the available processing load of the UAV computing unit before minimizing the available processing load of the UGV computing unit and to minimize the available processing load of the UGV computing unit before minimizing the available processing load of the external computing unit.

* * * * *